United States Patent [19]

Hines

[11] Patent Number: 4,664,484
[45] Date of Patent: May 12, 1987

[54] VARIABLE LIGHT ATTENUATOR

[76] Inventor: Stephen P. Hines, 4525-B San Fernando Rd., Glendale, Calif. 91204

[21] Appl. No.: 766,513

[22] Filed: Aug. 19, 1985

[51] Int. Cl.$^4$ .......................... G02F 1/19; G02B 17/00
[52] U.S. Cl. .................... 350/394; 350/407; 350/622; 350/623
[58] Field of Search .................. 350/394–395, 350/407, 485–486, 622–624, 6.2, 6.91

[56] References Cited

U.S. PATENT DOCUMENTS 2,651,971 9/1953 Rosch ..................................... 350/407
4,398,806 8/1983 Bennett et al. ......................... 350/394

FOREIGN PATENT DOCUMENTS 319869 10/1929 United Kingdom ................. 350/394

OTHER PUBLICATIONS

Dubrovskii et al, "Device for Continuous Attenuation of a Light Beam", Instrum. & Exp. Tech. (USA), 9-1970.
Watanabe, N., "A Useful Device for an Axis Variation of the Angle of Incidence", Jr. of Physics E, 7-1975, pp. 546.
Golovachev et al, "Disrupted-Total-Internal-Reflection Polarizing Attachment", Instrum. & Exp. Tech. (USA), 2-1977, pp. 1159-1161.

Primary Examiner—William H. Punter
Attorney, Agent, or Firm—Warren W. Kurz

[57] ABSTRACT

A variable light attenuator comprises a pair of spaced optical elements, each having a reflective surface and at least one being adapted to variably polarize a light beam as a function of its angle of incidence. Means are provided for rotatably supporting the optical elements so that the beam, upon being reflected from both elements, is always parallel to the input beam, regardless of its angle of incidence. Preferably, a second pair of reflective elements, similarly structured, arranged and supported, cooperates with the first pair of reflective elements to produce a variably attenuated output beam which is colinear with the input beam.

20 Claims, 10 Drawing Figures

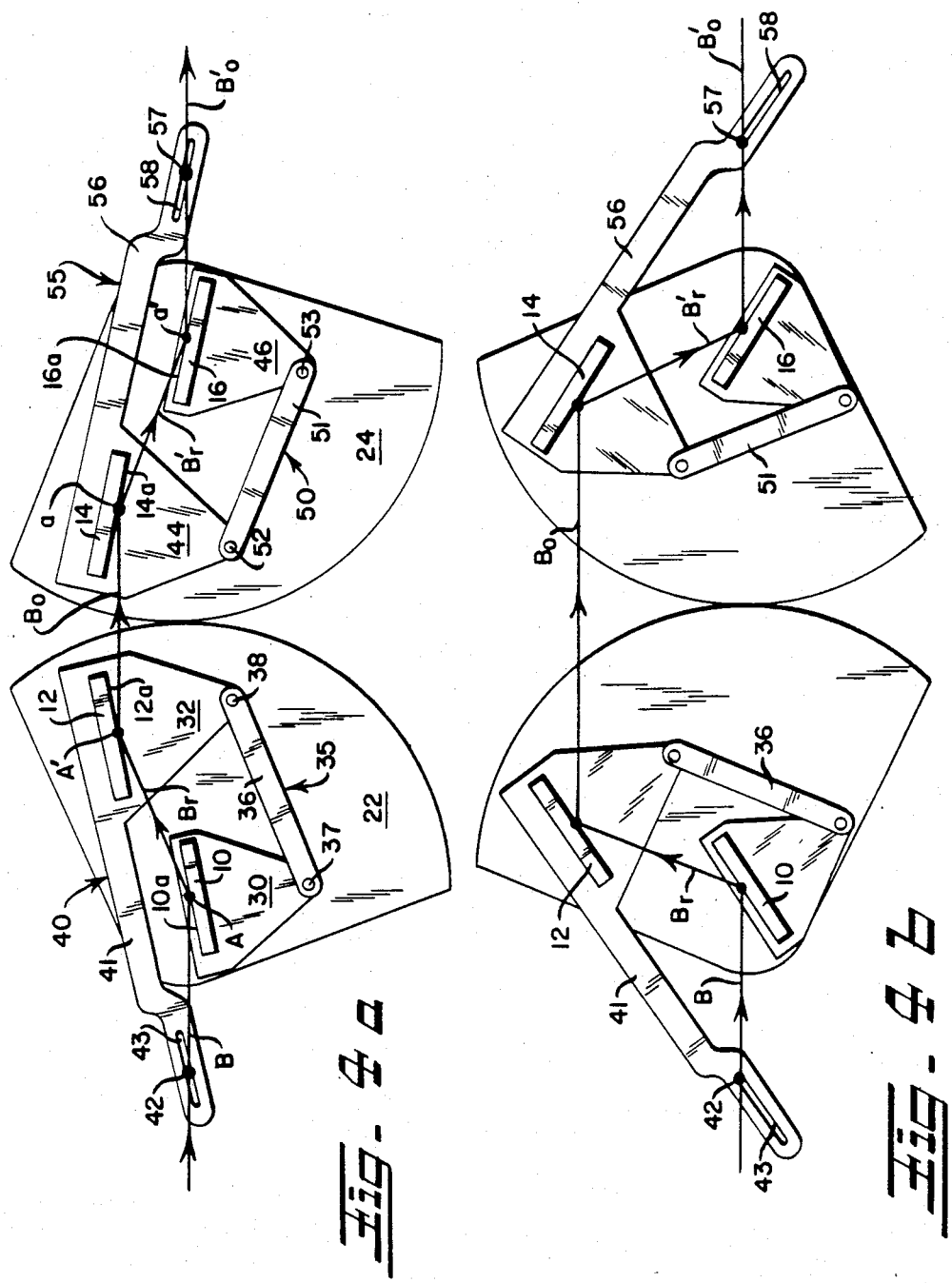

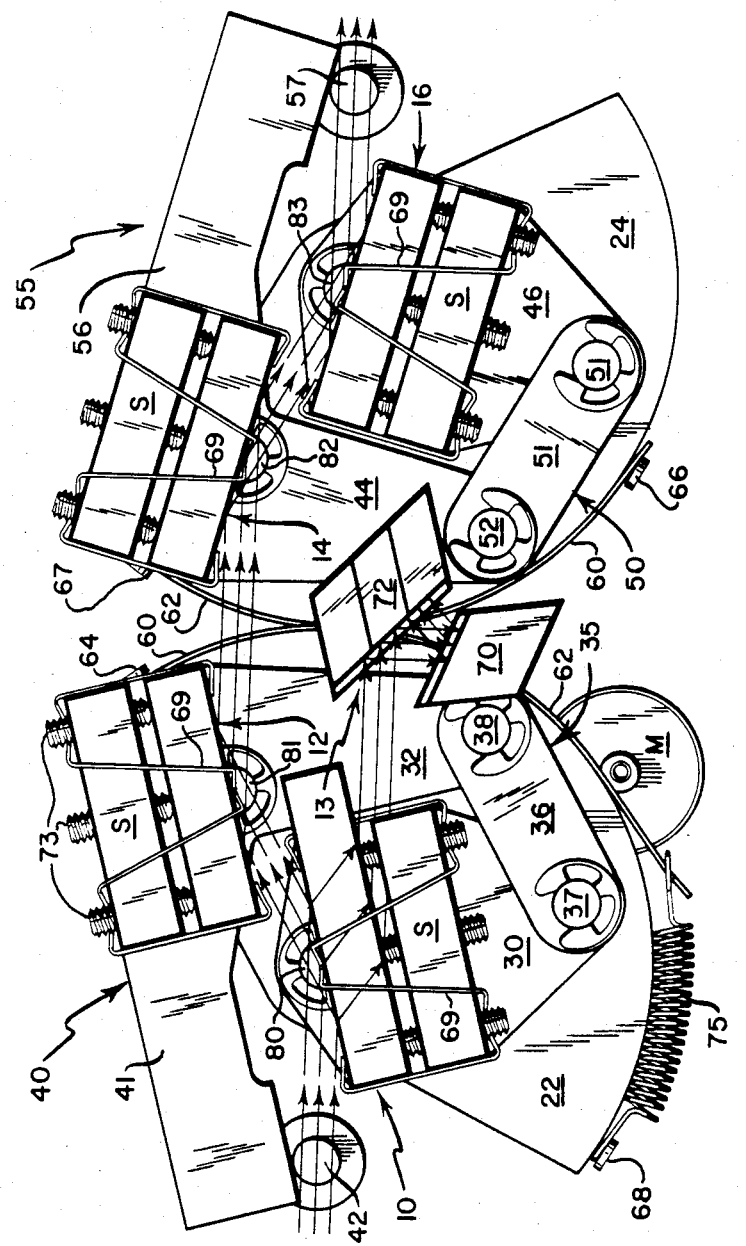

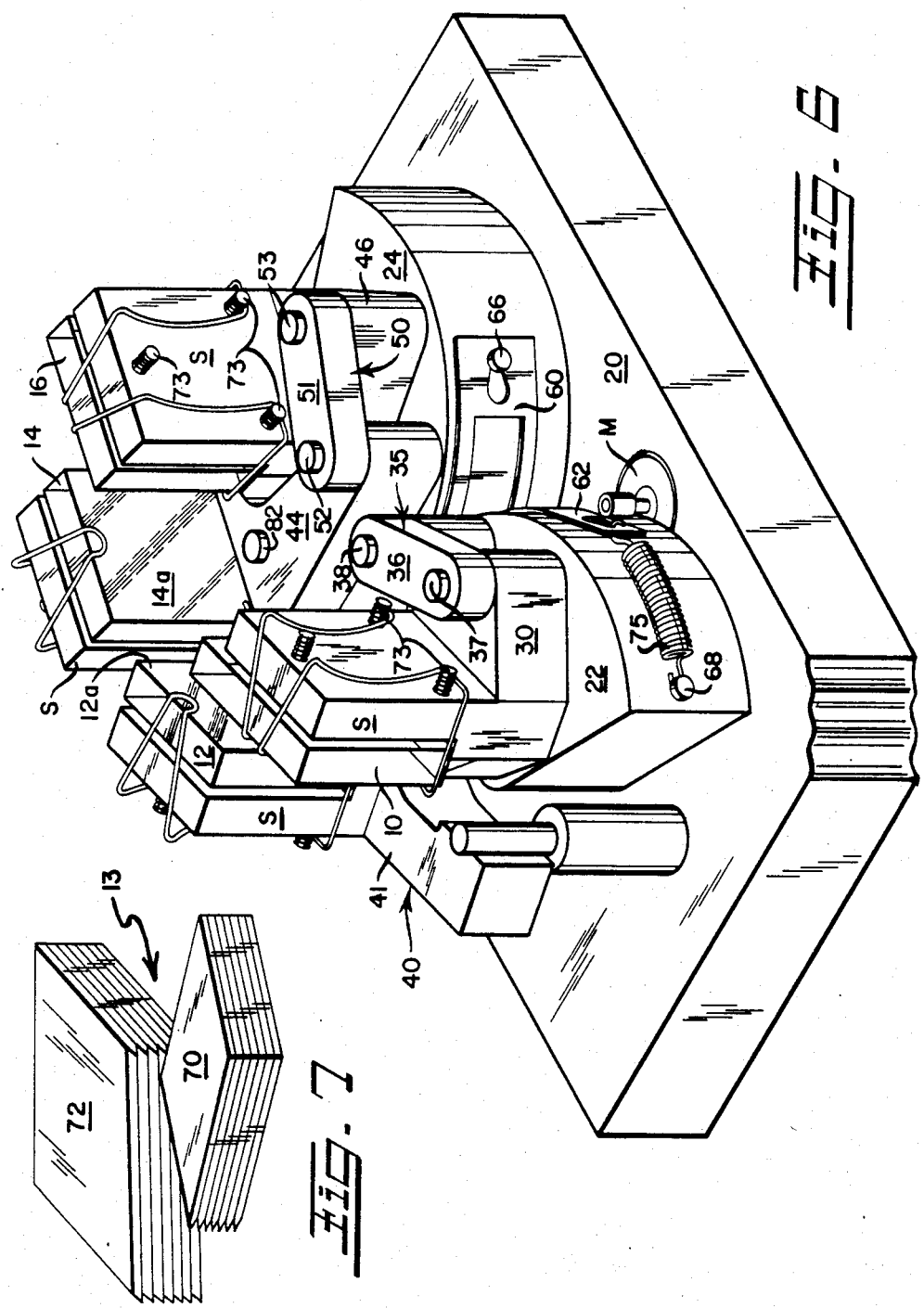

VARIABLE LIGHT ATTENUATOR

BACKGROUND OF THE INVENTION

1. Field of the Invention

This invention relates to apparatus for variably attenuating a light beam, such as a laser beam, via the selective polarization thereof.

2. Description of the Prior Art

In U.S. Pat. No. 4,398,806 issued to K. E. Bennett, there is disclosed an optical attenuator for variably attenuating a light beam (e.g. a laser beam) via the phenomenon of polarization. Such an attenuator comprises a pair of transparent, wedge-shaped plates of homogeneous dielectric material (e.g. glass or fused silica) positioned in the optical path to transmit and polarize an incident light beam as a function of the angle of incidence. The plates are arranged so that their respective angles of convergence are in opposite directions, and so that a major surface of one plate is parallel to a major surface of the other. Means are provided for simultaneously rotating the plates to vary the angle of incidence of the light beam on the first plate and to assure that the beam emerging from the second plate is parallel to the incoming beam. Optionally, a second pair of wedge-shaped plates, similarly structured, arranged and rotatably driven, is provided to receive the beam transmitted by the first pair and to refract the beam so that such beam, as transmitted by the second pair is colinear with the beam as incident on the first pair.

In optical attenuators of the above type, it is necessary for many applications that each of the four refractive elements be constructed from high quality optical media which can transmit electromagnetic radiation at a desired wavelength (that of the beam being attenuated) within the 0.3-10 micron spectral region. Also, each element must be accurately shaped to achieve the desired colinearity between input and output beams. These requirements, of course, add significant cost to such attenuators and, to some extent, limit their utility.

SUMMARY OF THE INVENTION

In view of the foregoing discussion, an object of this invention is to provide an optical attenuator of the polarizing type which, compared to the aforementioned prior art device, is less expensive to fabricate, and capable of operating more effectively over a broader spectral range.

This object is achieved by the provision of a polarizing, light-attenuator which, in contrast with the prior art, is based on the principle of reflection, rather than refraction. The optical attenuator of the invention comprises a pair of optical elements, each having a planar surface adapted to reflect an incident light beam, and at least one of such optical elements being adapted to variably attenuate an incident light beam, via polarization, as a function of the angle incidence of such beam on its respective planar surface. Means are provided for supporting these elements such that their respective planar surfaces are spaced apart and parallel, one of such surfaces being positioned to intercept the light beam and to reflect it to the other surface. The variable light attenuating apparatus of the invention also includes means for rotating the pair of optical elements simultaneously about spaced parallel axes and for moving one element relative to the other such that the beam reflected from the first element intercepts the rotational axis of the second element and is incident on the planar surface of the second element at an angle equal to the angle of incidence of such beam on the first element. By this arrangement, the beam as reflected by the second element is substantially parallel to the beam as incident on the first element and attenuated as a function of its angle of incidence on that element(s) which is adapted to variably attenuate light. Optionally, but preferably, the optical attenuator of the invention may further comprise a second pair of optical elements, each having a planar surface adapted to reflect a light beam and means for supporting such elements in the same manner as the first pair. The planar surface of one element of the second pair is positioned to intercept the beam upon being reflected by the planar surface of the second optical element of the first pair, and to reflect such beam onto the planar surface of the other optical element of the second pair. Means are provided for rotating the second pair and for moving one element relative to the other so that the beam as reflected by the second pair is substantially colinear with the beam incident on the first pair.

The invention will be better understood from the ensuing detailed description of preferred embodiments, reference being made to the accompanying drawings.

BRIEF DESCRIPTION OF THE DRAWINGS

FIGS. 4a and 4b illustrate two positions of a model mechanism for synchronizing the movement of the optical elements of the optical attenuator of the invention;

FIGS. 5 and 6 are a top plan and perspective views of a preferred embodiment of the invention; and FIG. 7 is a perspective view of a light trap, used in the FIG. 5 apparatus.

DETAILED DESCRIPTION OF PREFERRED EMBODIMENTS

Figure 1:
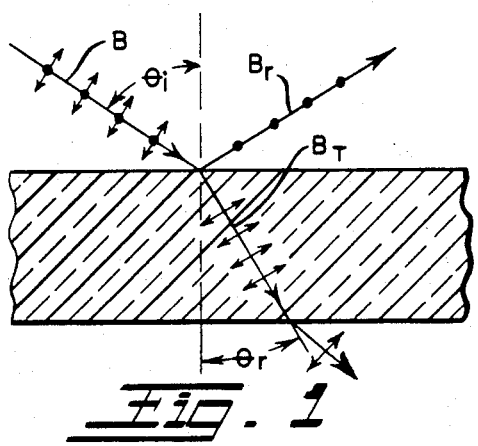
FIG. 1 illustrates the manner in which a beam of light is reflected, refracted, and polarized at an air/dielectric interface.

Referring to FIG. 1, an unpolarized light beam travelling in air and incident on a plane surface of a dielectric medium (e.g. glass or fused silica) at an angle $\theta_i$ will give rise to a reflected beam $B_R$ and a refracted or transmitted beam $B_T$. Depending on the angle of incidence, the reflected beam $B_R$ will be partially plane polarized and its intensity will vary accordingly. At Brewster's angle of incidence, which is approximately 57° for ordinary glass, the reflected beam is totally plane polarized and, theoretically, the intensity of the reflected beam is 50% that of the incident beam. The refracted beam $B_r$, of course, is also plane polarized in a perpendicular plane. Obviously, if the incident beam were initially plane polarized, as is the output of most lasers, it is possible to variably attenuate (from 0 to 100%) the intensity of the reflected beam $B_R$ by appropriately orienting the dielectric in the beam and adjusting the angle of incidence from grazing (i.e. 90°) up to Brewster's angle $\theta_b$ (i.e. 57° for glass). The ratio of the intensity of the reflected beam to the intensity of an incident, plane-polarized, beam is shown in curve R of FIG. 2. It is this well known principle of physical optics on which the present invention is based.

Figure 3A:
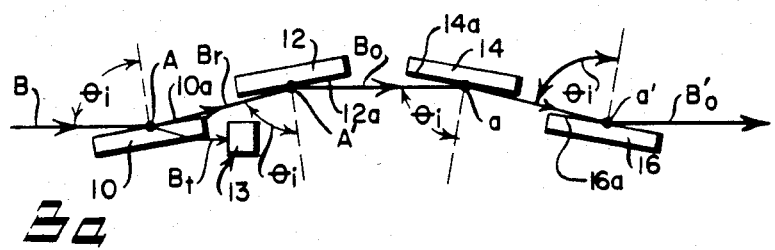
FIGS. 3a-3c are schematic illustrations showing the optical components of a preferred form of the optical attenuator of the invention in various positions.

Referring now to FIG. 3a, the variable light attenuator of the invention comprises a pair of spaced optical elements 10, 12 having plane parallel reflecting surfaces 10a, 12a, respectively. At least one of such elements, preferably element 10, is adapted to plane polarize a light beam B as a function of its angle of incidence $\theta_i$. As suggested above, element 10 may comprise, for example, a plate of dielectric material having a polished, but non-metallized, surface for reflecting the light beam. Upon striking element 10, two beams are formed, a reflective beam $B_r$ and a transmitted beam $B_t$ which is refracted by element 10, in the manner shown, to a light trap 13. Preferred materials for element 10 include glass, fused silica, quartz, germanium, zinc selenide, zinc sulfide, potassium chloride and lithium fluoride. These materials are preferred for their specific spectral transmission and reflection properties.

Element 12 may be identical in structure as element 10, but preferably comprises a glass blank having a metallized first surface of, for example, evaporated aluminum or silver. As shown and described in later drawings, means are provided for mounting elements 10, 12 for conjoint rotational movement about spaced, parallel axes, A, A', respectively, whereby the respective reflective surfaces of such elements track and remain parallel to each other at all times. As shown, axes A and A' lie in the plane of the reflective surfaces 10a and 12a, respectively. Further, as elements 10 and 12 rotate about their respective axes, means are provided for moving element 12 relative to element 10 such that its axis A' transcribes a circular art C (shown in FIG. 3b) having axis A of element 10 as its center of curvature. The manner in which the elements move relative to each other is shown in FIGS. 3a–3c.

Figure 2:
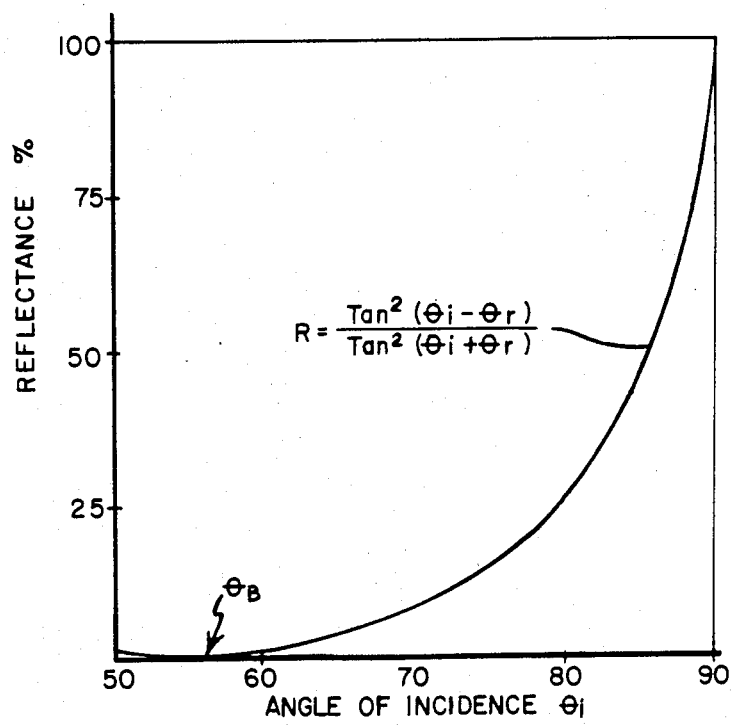
FIG. 2 shows the relationship between angle of incidence and the normalized intensity of a reflected light beam.

Element 10 is positioned in the optical path of light beam B so that the beam intercepts its rotational axis A and is incident on its reflective surface 10a at an angle $\theta_i$, measured from the perpendicular to the surface. To vary the intensity of beam B, means are provided for varying the angle of incidence $\theta_i$, preferably by rotating element 10 about its axis A. This approach allows the input beam to remain unchanged in direction. The relative intensity of the reflected beam $B_r$ is shown in FIG. 2 as a function of $\theta_i$. Upon being reflected from surface 10a, the reflected beam $B_R$ strikes the reflective surface 12a at the same angle of incidence $\theta_i$ as that at which the beam strikes surface 10a. Upon being reflected by surface 12a, the output beam $B_o$ will always be parallel to the input beam but, except for large values of $\theta_i$ always substantially displaced from the input beam.

Figure 3B:
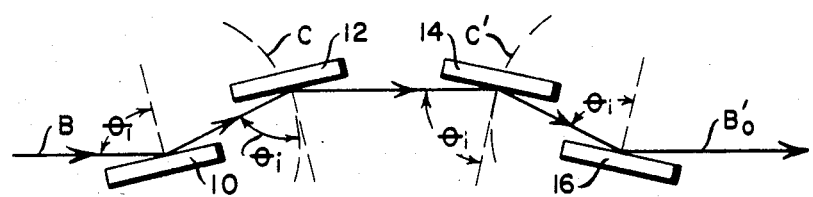
Figure 3C:
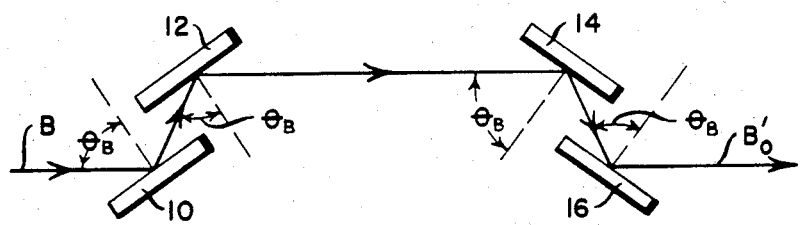

In order to achieve colinearity between input and output beams, a second pair of spaced, parallel optical elements 14, 16 may be added, as shown in FIGS. 3a–3c. Both of such additional elements preferably comprise a first surface reflector identical in structure to element 12. As in the case of elements 10 and 12, elements 14 and 16 are rotatably mounted for conjoint movement about spaced parallel axes a, and a', respectively, which are coplanar with their respective planar surfaces. Similar to element 12, element 14 is mounted for movement in a circular art C' (shown in FIG. 3b) about axis a' of element 16. Means are provided, as discussed below, for synchronizing the movement of both pairs of optical elements. During the movement of the four optical elements, axes A and a' remain coplanar, as do axes A' and a.

The reflective surface 14a of element 14 is positioned to always intercept the output beam $B_o$ of elements 10 and 12 at the same angle of incidence $\theta_i$ as that at which the input beam B strikes element 10. Upon striking surface 14a, the beam is reflected to the reflective surface 16a of element 16, always striking such surface at the same angle of incidence as all other angles of incidence. The output beam $B_o'$ reflected from surface 16a is colinear with the input beam B.

Compared with the aforementioned transmission-type light attenuators, the apparatus of this invention can achieve colinearity with only one light-polarizing optical element. While the other reflecting element(s) may also be a polarizing dielectric, it would have the undesired effect of producing a more severe change in intensity for nominal changes in the angle of incidence $\theta_i$.

In FIGS. 4a and 4b, a model apparatus is shown in two different positions to facilitate an understanding of a preferred mechanism for achieving the above-mentioned synchronized movement of the optical elements 10, 12, 14 and 16. Such apparatus comprises a support plate (not shown) having two sector-shaped plates 22, 24 rotatably mounted thereon for movement about spaced, parallel axes, A, a', respectively. As will be evident, like reference characters represent like parts in all of the drawings; thus, axes A and a' represent the same axes in FIG. 3a. Means are provided (e.g. the drive motor M shown in FIGS. 5 and 6) for controlling the angular position of plate 22 about axis A, and coupling means (e.g. the flexible straps shown in FIGS. 5 and 6) are provided for rotatably driving plate 24 in a direction opposite that of plate 22 and in synchronism therewith.

The polarizing optical element 10 is supported by wedge-shaped member 30. The latter is rotatably mounted for movement about axis A and positioned such that axis A is in the plane of reflective surface 10a approximately bisecting such surface. Optical element 12 is supported by a second wedge-shape member 32 which is rotatably mounted on the sector-shaped plate 22 for movement about axis A'. First linking means 35 are provided for interconnecting members 30 and 32 so that, as plate 22 rotates about axis A, surfaces 10a and 12a remain parallel to each other. Linking means 35 comprises a linking arm 36 which is pivotally supported at each end by pivot pins 37, 38 mounted on the apexes of wedge-shaped members 30 and 32, respectively. Second linking means 40 are provided for coupling optical element 12 to the support plate to assure that, during rotation of plate 22, the beam $B_r$ reflected from surface 10a intercepts surface 12a at its midpoint, where axis A' is located. Linking means 40 comprises an arm 41 which is rigidly coupled to member 32 at one end, and is slidably connected to the support plate by a pin 42 and slot 43 arrangement. Proper geometry dictates that the slot formed in arm 41 must be coplanar with surface 12a, and that the spacing between pin 42 and axis A equal the spacing between axes A and A'.

In a similar manner as that described above, elements 14 and 16 are rotatably mounted about axes a and a', respectively, axis a being the axis of a pin extending from sector-shaped plate 24, and axis a' being the axis of a pin about which plate 24 is rotatably mounted. Elements 14 and 16 are supported by wedge-shaped members 44 and 46, respectively, element 44 being rotatably mounted for movement about axis a, and element 46 being rotatably mounted for movement about axis a'. A third linking means 50 is provided for coupling members 44, 46 for conjoint rotational movement about their respective axes. Linking means 50 comprises a linking arm 51 having opposed ends which are pivotally connected to the apices of members 44 and 46 by pins 52 and 53, respectively. Fourth linking means 55 are provided for coupling optical element 14 to the support plate to assure that, during rotation of plate 24, the output beam $B_o$ reflected by surface 12a strikes surface 14a at its midpoint, where axis a is located, and the beam $B'_r$ reflected by surface 14a strikes surface 16a at its midpoint, where axis a' is located. Linking means 55 comprises a linking arm 56 which is rigidly coupled at one end to member 44, and slidably connected at its other end to plate 20 by a pin 57 and slot 58 arrangement. Pin 57 is supported by the support plate and slot 58, formed in arm 56, is coplanar with surface 14a.

In order to synchronize the opposite rotational movements of plates 22 and 24, a pair of flexible straps 60, 62, shown in FIGS. 5 and 6, are provided for coupling these plates at their respective peripheries. Strap 60 is connected at one end to plate 22 by pin 64 and runs along the upper arcuate edge thereof until it reaches the tangent point between the plates, at which point it crosses over to the lower arcuate edge of plate 24, and follows the arcuate edge thereof. The opposite end of strap 60 is connected to plate 24 by pin 66. Similarly, strap 62 is connected at one end to the top of plate 24 by pin 67 and runs along the upper arcuate edge thereof until it reaches nip region that is, the tangent point between plates 22 and 24, at which point it crosses over to the lower arcuate edge of plate and follows the arcuate edge thereof. A pin 68 serves to connect the opposite end of strap 62 (via a coil spring 75, described below) to plate 22.

Referring specifically now to FIGS. 5 and 6. a preferred embodiment of the variable light attenuator of the invention is shown from the top and in perspective, respectively. The reference characters shown correspond to those parts already described. In this preferred embodiment, each of the optical elements 10, 12, 14 and 16 is clamped to a rectangular support S by a spring clip 69. Each of the supports S function to support a plurality of set screws 73 which serve to adjust the positions of the optical elements to achieve an intended optical path for the incident beam B. Rotational axes A, A', a and a' are defined by the longitudinal axes of shafts 80–83, respectively. Shafts 81 and 82 are supported by the sector plates 22 and 24, respectively and serve, in turn to rotatably support wedge-shaped members 32 and 44, respectively. Shafts 80 and 83 extend upwardly from support plate 20 (shown in FIG. 6). Shaft 80 rotatably supports sector plate 22 and wedge-shaped member 30. Shaft 83 rotatably supports sector plate 24 and wedge-shaped member 46. A coil spring 75 serves to connect one end of strap 62 to pin 68, such spring serving to exert tension on the strap to maintain contact between the straps and the respective arcuate edges of plates 22 and 24, as well as to eliminate any backlash or play between plates 22 and 24. A small motor M is provided for rotating sector-shaped plate 22 about axis A. The drive shaft of the motor may be coupled to the plate's arcuate edge by means of a cable or a suitable gear train.

In order to eliminate the light transmitted by element 10 (i.e. the beam $B_t$ in FIG. 3a), a light trap may be provided. In FIGS. 5 and 7, such light trap is shown to comprise two stacks 70, 72 of razor blades, the surfaces of which absorb light. Stack 72 is angularly arranged relative to beam $B_t$ so that the beam strikes the beveled edges thereof and is reflected by multiple reflections (a total of 8) into and out of the stack interior. Any light which survives the multiple reflection in stack 72 is received by the beveled edges of the second stack 70 and again subjected to multiple reflections into the interior of stack 70. Light which emerges from stack 70 is again directed to stack 72 where it undergoes further trapping. Assuming that the ground metal edges of the blades have a reflectivity of 30%, a total of eight reflections within each stack, and a stack arrangement whereby the light beam is reflected a total of five times between the stacks, it is possible to attenuate the transmitted beam by a factor of $10^{-21}$ or more.

As will be apparent to those skilled in the art from the above description, the variable light attenuating apparatus of the invention lends itself to low-cost manufacture, requiring only one element to transmit the to-be-attenuated beam of radiation. This makes the apparatus particularly attractive for use in those wavelength regions (ultraviolet and infrared) where relatively exotic materials must be used owing to their transmission properties.

The invention has been described with reference to a particular embodiment. Skilled artisans will recognize certain equivalent structures and obvious modifications which fall within the spirit and scope of the invention. Such are intended to be protected by the following claims.

I claim:

1. Apparatus for variably attenuating a beam of plane polarized radiation, said apparatus comprising: (a) first and second optical elements, each of said elements having a planar surface adapted to reflect an incident beam of radiation, and one of said elements being adapted and arranged to variably attenuate such beam, via polarization, as a function of the angle of incidence of such beam on its respective planar surface; (b) means for supporting such elements such that their respective planar surfaces are spaced apart and parallel, the planar surface of said first element being positioned to intercept the beam and to reflect such beam to the planar surface of said second element; (c) means for rotating said first and second elements simultaneously about spaced parallel axes while maintaining their parallel relationship such that the optical path of the beam as reflected by the second element is substantially parallel to the beam as incident on said first element and the beam is attenuated as a function of its angle of incidence on said element adapted to variably attenuate such beam; and (d) means for moving said second element relative to said first element so that the axis of rotation of said secnd element traverses a circular arc about the axis of rotation of the first element.

2. The apparatus as defined by claim 1 wherein said at least one of said elements comprises a non-metallized light-transmitting material.

3. The apparatus as defined by claim 2 wherein said material is selected from the group consisting of fused silica zinc selenide, zinc sulfide, lithium fluoride, germanium and potassium chloride.

4. The apparatus as defined by claim 2 wherein said material is glass.

5. The apparatus as defined by claim 1 further comprising a trap for attenuating any portion of the beam which is transmitted by said optical element which variably attenuates light.

6. The apparatus as defined by claim 1 further comprising (d) third and fourth optical elements, each having a planar surface adapted to reflect a light beam; (e) means for supporting said elements such that their respective planar surfaces are spaced apart and parallel, the planar surface of said third element being positioned to intercept said beam upon being reflected by the planar surface of said second optical element and to reflect such beam onto the planar surface of said fourth optical element; and (f) means for rotating said third and fourth elements simultaneously about spaced parallel axes and moving the third element relative to the fourth element such that the beam as reflected by the planar surface of the fourth element is substantially colinear with the beam incident on said first element.

7. The apparatus as defined by claim 6 wherein means are provided for moving the rotational axes of said second and third elements in a circular arc relative to the rotational axes of said first and fourth elements, respectively, whereby the beam intercepts the respective rotational axes of each of the elements for any angle of incidence.

8. Apparatus for variably attenuating a light beam by variably polarizing such beam, said apparatus comprising:
(a) a support plate;
(b) a first sector-shaped plate mounted on said support plate for rotational movement about a first axis which intercepts the beam and is perpendicular thereto;
(c) first and second optical elements, each having a planar surface for reflecting an incident light beam, at least one of said elements being adapted to variably polarize an incident light beam as a function of the angle of incidence on its respective planar surface;
(d) means for movably mounting said first optical element for rotational movement about said first axis, said first element being located such that said first axis is in the plane of its respective planar surface and such that the beam is incident upon the planar surface thereof;
(e) means for rotatably mounting said second optical element on said sector-shaped plate for rotational movement about a second axis spaced from and parallel to said first axis, said second axis being in the plane of the second element's planar surface, and said second element being located such that its planar surface is positioned to intercept and reflect the light beam upon being reflected by said first element's planar surface;
(f) first linking means comprising a first linking assembly for coupling said first and second optical elements for conjoint rotational movement about their respective rotational axes, and a second linking assembly for coupling said second optical element to a point on said support plate, said point being spaced from said first axis a distance substantially equal to said spacing between said first and second axes, whereby the respective planar surfaces of said elements remain parallel to one another during such rotational movement and the beam reflected by said first element always intercepts the rotational axis of the second element; and
(g) means for rotating said first sector-shaped plate about said first axis to vary the angle of incidence of said beam on said first element's planar surface.

9. The apparatus as defined by claim 8 wherein said second linking assembly comprises a first support pin extending from said support plate at a location spaced from said first axis by a distance substantially equal to the spacing between the rotational axes of said first and second optical elements, and a first linking member having a rectilinear slot at one end thereof for slidably engaging said support pin, said slot being located to be coplanar with the reflective planar surface of said second optical element.

10. The apparatus as defined by claim 8 further comprising:
(h) a second sector-shaped plate mounted on said support for rotational movement about a third axis which is spaced from and parallel to said first axis;
(i) third and fourth optical elements, each having a planar surface for reflecting an incident light beam;
(j) means for rotatably mounting said third and fourth optical elements for movement about spaced, parallel axes, each axis being in the plane of the planar surfaces of said third and fourth elements and one of said axes being colinear with said third axis, said third element being positioned such that its planar surface intercepts the light beam upon being reflected by said second element and reflects such beam to the planar surface of said fourth element;
(k) second linking means comprising a third linking assembly for linking said third and fourth elements for conjoint rotational movement about their respective rotational axes, and a fourth linking assembly for linking said third element to a second point on said support plate, said second point being spaced from the axis of said fourth element by a distance substantially equal to the spacing between the axes of said third and fourth optical elements, whereby the respective planar surfaces of said third and fourth elements remain parallel to one another during such rotational movement and the beam reflected by said fourth element's planar surface is parallel to the beam incident on the third element's planar surface; and
(l) means for coordinating rotational movement of said first and second sector-shaped plates so that the respective angles of incidence of the light beam on said first and second optical elements' planar surface are substantially equal to the respective angles of incidence of the beam on said third and fourth elements' planar surfaces.

11. The apparatus as defined by claim 8 wherein at least one of said optical elements comprises a material selected from the group consisting of fused silica, zinc selenide, zinc sulfide, lithium fluoride, germanium and potassium chloride.

12. The apparatus as defined by claim 8 further comprising a light trap for attenuating that portion of the light beam which is transmitted by the optical element(s) which variably attenuates light.

13. The apparatus as defined by claim 10 wherein said coordinating means comprises a pair of flexible straps which interconnect said sector-shaped plates for conjoint movement about their respective pivot axes.

14. A method for variably attenuating a beam of plane polarized radiation comprising the steps of:
(a) sequentially reflecting such a beam from first and second spaced optical elements, each of said elements having a planar surface adapted to reflect such beam, and at least one such of elements being adapted and arranged to variably attenuate such beam, via changing the state of polarization of such beam, as a function of the angle of incidence of such beam on its respective planar surface;

(b) supporting such elements so that their respective planar surfaces are parallel, the planar surface of the first element being positioned to intercept the beam and to reflect such beam to the planar surface of the second element;

(c) rotating the first and second elements simultaneously about spaced parallel axes so that the optical path of the beam as reflected by the second element is substantially parallel to the path of the beam as incident on the first element; and (d) moving the second element relative to the first element in such a manner that the optical path of the beam reflected from the first element always intercepts the axis of rotation of the second element.

15. The method as defined by claim 14 wherein that element that variably attenuates the beam comprises a non-metallized light-transmitting material.

16. The method as defined by claim 15 wherein said material is selected from the group consisting of fused silica, zinc selenide, zinc sulfide, lithium fluoride, germanium and potassium chloride.

17. The method as defined by claim 15 wherein said material is glass.

18. The method as defined by claim 14 further comprising the step of trapping any portion of the beam which is transmitting by that optical element which variably attenuates the beam.

19. The method as defined by claim 14 further comprising the steps of (e) sequentially reflecting the beam as reflected by the second optical element from third and fourth spaced optical elements, each having a planar surface adapted to reflect the beam; (f) supporting the third and fourth elements so that their respective planar surfaces are parallel, the planar surface of the third element being positioned to intercept the beam upon being reflected by the second optical element and to reflect such beam onto the planar surface of the fourth optical element; and (g) rotating the third and fourth optical elements simultaneously about spaced, parallel axes so that the beam as reflected by the planar surface of the fourth element is substantially colinear with the beam incident on the first element.

20. The method as defined by claim 19 wherein the second and third elements are moved in such a manner that their respective axes of rotation traverse a circular arc relative to the rotational axes of the first and fourth elements, respectively, whereby the beam intercepts the respective rotational axes of each of the elements for all angles of incidence.

* * * * *